US012679741B2

(12) United States Patent
Chen et al.

(10) Patent No.: US 12,679,741 B2
(45) Date of Patent: Jul. 14, 2026

(54) AEROSOL-ASSISTED SYNTHESIS OF CRYSTALLINE TUNGSTEN BRONZE PARTICLES

(71) Applicant: VIRGINIA COMMONWEALTH UNIVERSITY, Richmond, VA (US)

(72) Inventors: Daren Chen, Glen Allen, VA (US); Hao Tu, Henrico, VA (US)

(73) Assignee: Virginia Commonwealth University, Richmond, VA (US)

( * ) Notice: Subject to any disclaimer, the term of this patent is extended or adjusted under 35 U.S.C. 154(b) by 675 days.

(21) Appl. No.: 18/040,687

(22) PCT Filed: Aug. 2, 2021

(86) PCT No.: PCT/US2021/044125
§ 371 (c)(1),
(2) Date: Feb. 6, 2023

(87) PCT Pub. No.: WO2022/035631
PCT Pub. Date: Feb. 17, 2022

(65) Prior Publication Data
US 2023/0278884 A1      Sep. 7, 2023

Related U.S. Application Data

(60) Provisional application No. 63/064,021, filed on Aug. 11, 2020.

(51) Int. Cl.
*C01G 41/00*      (2006.01)

(52) U.S. Cl.
CPC ........ *C01G 41/006* (2013.01); *C01P 2002/72* (2013.01); *C01P 2004/03* (2013.01)

(58) Field of Classification Search
CPC . C01G 41/006; C01P 2002/72; C01P 2004/03
See application file for complete search history.

(56) References Cited

U.S. PATENT DOCUMENTS

| | | |
|---|---|---|
| 8,268,202 B2 | 9/2012 | Mamak |
| 2005/0147752 A1 | 7/2005 | Kodas |
| 2009/0044421 A1 | 2/2009 | Adiga |

(Continued)

OTHER PUBLICATIONS

Lund, "A First Course on Kinetics and Reaction Engineering", https://wwwresearch.sens.buffalo.edu/karetext/unit_29/unit_29.shtml ( Year: 2014).*

(Continued)

*Primary Examiner* — Michael Forrest
*Assistant Examiner* — Nicole Lee Quist
(74) *Attorney, Agent, or Firm* — WCF IP

(57)      ABSTRACT

Provided herein are methods for producing crystalline tungsten bronze oxide particles. The method may include atomizing a liquid solution comprising an alkali metal precursor and a tungsten precursor to produce droplets; mixing the droplets with one or more gaseous flows to produce a combined flow; flowing the combined flow through a heated reactor to provide crystalline tungsten bronze oxide particles having the formula $M_xWO_3$, wherein M is the alkali metal; and collecting the particles.

17 Claims, 15 Drawing Sheets

(56) References Cited

U.S. PATENT DOCUMENTS

2020/0230703 A1    7/2020   Katusic

OTHER PUBLICATIONS

Li et al, "Design and performance simulation of the spiral mini-channel reactor during H2 absorption", International Journal of Hydrogen Energy, 2015, 40, 13490-13505 (Year: 2015).*

Hirano et al, "Synthesis of highly crystalline hexagonal cesium tungsten bronze nanoparticles by flame-assisted spray pyrolysis", Advanced Powder Technology, 2018, 29, 2512-2520 (Year: 2018).*

Lund, "A first Course on Kinetics and Reaction Engineering", https://wwwresearch.sens.buffalo.edu/karetext/unit_29/unit_29.shtml, 2014 (Year: 2014).*

Nakakura et al, "Cationic Defect Engineering for Controlling the Infrared Absorption of Hexagonal Cesium Tungsten Bronze Nanoparticles", Inorg. Chem., 2019, 58, 9101-9107 (Year: 2019).*

Tu et al: "Aerosol-assisted Production of NIR Shielding Nanoparticles: Sodium Tungsten Bronze", Aerosol and Air Quality Research, vol. 20, iss. 4, p. 690-701, Apr. 1, 2020.

* cited by examiner

FIG. 11A                    FIG. 11B                    FIG. 11C

AEROSOL-ASSISTED SYNTHESIS OF CRYSTALLINE TUNGSTEN BRONZE PARTICLES

FIELD OF THE INVENTION

The invention is generally related to an aerosol-assisted synthesis to produce crystalline tungsten bronze oxide particles using low-cost precursors.

BACKGROUND OF THE INVENTION

Near-infrared (NIR) light is the radiation with a wavelength ranging from 0.75 μm to 1.5 μm, making up ~18% of solar radiation energy on the earth's surface according to the previous measurement (ASTM International, 2012). The thermal effect of NIR increases the energy consumption for air conditioning (AC) of a building/automobile in hot weather. In cold weather, keeping NIR from escaping to the outside can also reduce thermal energy loss by radiation. The energy uses for heating, ventilating, and air conditioning (HVAC) of buildings is estimated at ~50% of the total energy consumption for the building service in the US and UK (Pérez-Lombard et al., 2008). The energy for the HVAC operation of automobiles is ~17% (Lambert and Jones, 2006). Shielding the NIR light through the windows of buildings and cars is thus in great demand for energy-saving.

Various functional materials could be utilized to shield NIR from penetrating through transparent media such as glass. The commercial NIR shielding glass coating includes dielectric-Ag-dielectric films, metal-free solar reflecting films, and functional particles-imbedded film (Padiyath et al., 2007). The dielectric-Ag-dielectric film reflects the NIR by the multiple-film structure of Ag layers and dielectric oxide layers, e.g., indium tin oxide (ITO) and antimony tin oxide (ATO) (Schaefer et al., 1997). Ag is applied in the layer because of its unique optical properties (Berning and Turner, 1957; Berning, 1983). Both ITO and Ag are expensive due to their production scale and storage (Padiyath et al., 2007). In addition, the manufacture of dielectric-Ag-dielectric films is by the sputtering processing, in which highly precise thickness control of the Ag layer is required since the extra thickness of the Ag layer would result in the dramatic reduction of visible light transmission (Padiyath et al., 2007).

Furthermore, the presence of the Ag layer could reduce the signal strength of cell phones, GPS, etc., due to its high electrical conductivity. For the metal-free solar reflecting films, their NIR shielding function relies on the refractive index difference of polymer layers (Weber et al., 2000). The above films typically have laminated construction with hundreds of layers, and the commercial products of the above films have been applied to the automobile since the early 2000s (Padiyath et al., 2007). However, the irreversible aging of polymer-based films typically occurs because the C—C bond is vulnerable to the high-energy UV photons in solar light. In general, the lifespan of a piece of high-quality metal-free solar reflecting film is ~10 years (Tintcenter.com, 2011). The above makes metal-free films unpopular in permanent cases such as architectural windows.

Without any special film structure requirement, the other candidates for the NIR shielding are the functional-particle-imbedded films Examples of these functional particles are rare-earth hexaboride (ReB$_6$, Re=La, Ce, Pr, Nd, and Gd) and tungsten bronze (M$_x$WO$_3$, M=Li, Na, Cs, Ru, K, NH$_4$, etc.) in the previous studies (Kimura et al., 1990; Takeda et al., 2008; Adachi et al., 2010; Guo et al., 2010, 2011, 2012a).

The performance of rare-earth hexaboride particles is related to particle size. The NIR absorption is based on the localized surface plasma resonance (LSPR) of conduction electrons (Takeda et al., 2008). Particles in a certain size range exhibits effective NIR shielding. The range of wavelength for shielding NIR is also selective for the above particles (Kimura et al., 1990; Takeda et al., 2008). Unlike the LSPR mechanism, tungsten bronze particles shield the NIR via the insertion of alkali ions into tungsten oxide crystal lattice to form a solid solution, commonly observed in either the cubic or tetragonal crystal phase. Due to the ternary addition of positive ions, free electrons are induced to interact with photons by dipole absorption, which is the reason for general wide-range NIR absorption by tungsten bronze (Svensson and Granqvist, 1984; Takeda and Adachi, 2007). Furthermore, as a family member of tungsten trioxide, tungsten bronze is insoluble in water and all acids except hydrofluoric acid (Luo, 2010). It implies that tungsten bronze is chemically stable in indoor/outdoor environments.

The initial synthesis of tungsten bronze was reported by Wöhler (1824) via the thermal reduction of fused salts. Various tungsten bronzes (M$_x$WO$_3$, M=Li, Na, K, Ru, Cs) were later produced by the thermal reduction method (Straumanis, 1949; Straumanis and Hsu, 1950; Magnéli and Blomberg, 1951). Combined with electrolysis, the high-quality crystal (in millimeter sizes) of tungsten bronzes with the tuned x in M$_x$WO$_3$ were produced (Brown and Banks, 1954; Shanks, 1972). The melt salt reaction generally requires high temperatures and typically results in macro-sized bulk products (~3 cm). However, micro- or nanoparticles are more friendly to the processing (compared with macro-sized products). Grinding large crystals into powder form is expensive in energy and easily contaminated. The wet chemical method has thus been used first to prepare the sol-gel precursor composed of amorphous tungsten oxide and then obtain the tungsten bronze powder through the thermal hydrogen reduction (M$_{0.33}$WO$_3$, M=Tl, Rb, Cs) (Takeda and Adachi, 2007). The nanoparticle of tungsten bronzes (M$_x$WO$_3$, M=K, Ru, Cs, NH$_4$) was directly synthesized at low temperature (Guo et al., 2010, 2011, 2012a, b). Although multiple methods were proposed to produce tungsten bronze particles, the worldwide production of tungsten bronze powders remains extremely low. The processing methods, including the melting salt, powder grinding, hydrothermal, and calcination, are energy-costly and time-consuming.

Aerosol-based processing has been applied to produce particles in the sub-micrometer and even nanometer size range (Messing et al., 1993; Eerikainen et al., 2003). Particles in amorphous phases are typically produced by aerosol-based processing. Because of its continuous operation at a high rate (Charitidis et al., 2014) and the high reproducibility for the product quality and purity (Gurav et al., 1993), the aerosol-based process is generally considered a synthesis method easy for future scale-up production. Furthermore, the characteristics of particles could be controlled in tube reactors by varying the tube temperature, flow rate, and chemical composition of solutions in aerosol-based synthesis (Gurav et al., 1993). To make the synthesis of tungsten bronze easy for future scale-up production, the flame-assisted method was proposed in the work of Hirano et al. (2018) for producing cesium tungsten bronze particles. In their report, the precursor can be continuously produced by flame-assisted synthesis. However, another individual annealing remains necessary to promote the crystallinity and eliminate the multiple phases.

Furthermore, cesium is used as a doping ion in the tungsten oxide in their work. Since the natural abundance of cesium is very low, the price of cesium compound is very high for large-scale production of NIR shielding materials. So, in order to make the tungsten oxide bronze to be feasible for industry-scale production for NIR shielding, a simple one-step method that can continuously produce crystallized and monophasic particles remains a challenge. The needs are also found in electrochromic and gas-sensing nanomaterial, which rely on the crystalline tungsten oxide compounds.

SUMMARY

Described herein are aerosol-based methods of producing tungsten bronze particles. The technique utilizes the aerosol approach to create crystalline tungsten bronze nanoparticles having a tunable size in a one-step, scalable and continuous process. The manufacturing device can maintain automatic running at high temperatures for days, and most of the carrier gas may be recycled in the processing. Moreover, the method yields high purity tungsten bronze particles with no other byproducts, reducing overall waste. The methods described herein utilize simplistic, non-toxic precursor materials that can be manipulated, allowing the species of the tungsten bronze particles to be varied. Overall, the synthesis methodology described herein provides for the next generation of solar control transparent materials resulting in reduced costs, high yields, tunable particle sizes, and rapid and continuous synthesis of tungsten bronze particles for the shielding of NIR and UV light.

An aspect of the disclosure provides a method for producing crystalline tungsten bronze oxide particles, comprising atomizing a liquid solution comprising an alkali metal precursor and a tungsten precursor to produce droplets; mixing the droplets with one or more gaseous flows to produce a combined flow; flowing the combined flow through a heated reactor to provide crystalline tungsten bronze oxide particles having the formula $M_xWO_3$, wherein M is the alkali metal; and collecting the particles.

In some embodiments, the particles are collected using baghouse filter sampling, a cyclone, a cascade impactor, a thermo-precipitator, or electrostatic sampling. In some embodiments, the tungsten precursor is ammonium tungstate or tungsten chloride. In some embodiments, the alkali metal is selected from sodium, potassium, and cesium. In some embodiments, the ratio of alkali metal precursor to tungsten precursor is from 0.4:1 to 1:1.

In further embodiments, the one or more gaseous flows comprise nitrogen and hydrogen. In some embodiments, a flow rate through the reactor is 0.1-15 SLPM. In some embodiments, the reactor comprises a plurality of tube reactors. In some embodiments, the reactor comprises a spiral flow channel. In some embodiments, the reactor is heated to a temperature of 400-1000° C. In some embodiments, the particles are in the cubic phase or tetragonal phase. In some embodiments, the method further comprises recirculating a gaseous flow after the particles are collected. In some embodiments, the liquid solution is an aqueous solution and does not contain an organic solvent. In some embodiments, the method does not include an annealing step. The method may further comprise introducing a dilution flow to the combined flow flowing through the reactor. In some embodiments, a ratio of a flow rate of the dilution flow to a flow rate of the combined flow is from 2:1 to 10:1. The dilution flow may be heated or unheated.

DETAILED DESCRIPTION

Figure 1:
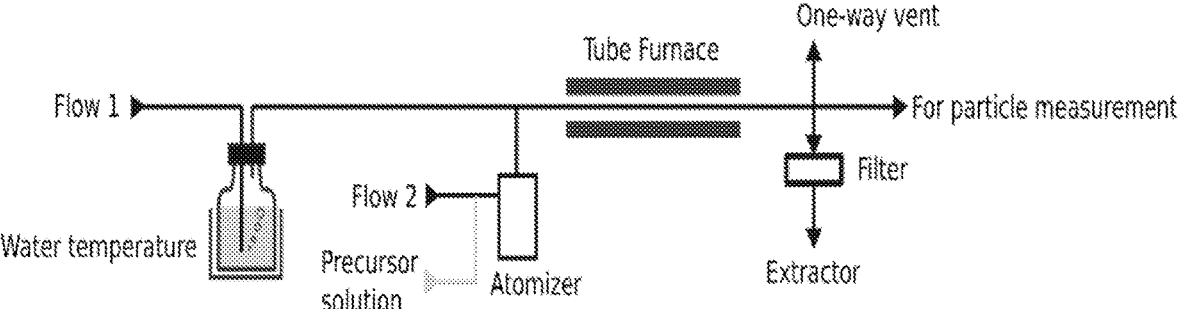
FIG. 1. Diagram of an aerosol-assisted reactor with a Collison atomizer according to some embodiments of the disclosure.

Embodiments of the disclosure provide methods of aerosol-assisted synthesis to produce crystalline tungsten bronze oxide ($M_xWO_3$) particles, where M is an alkali metal. The production process is in one step, continuous, and without any aftertreatment. The sizes of as-produced $M_xWO_3$ particles may be controlled by adjusting the dilution and quenching of reaction agents. Due to the high transmittance in visible range (VLT) and excellent absorption in NIR range, the synthesized $M_xWO_3$ particles may be used as a near infrared (NIR) shielding material which could be applied to transparent media such as glass as disclosed in U.S. Patent Application 2020/0002220 incorporated herein by reference.

Tungsten bronze particles as described herein are tungsten oxide ($WO_3$) lattice based, with alkali metal atoms inserted into the voids in the $WO_3$ lattices forming nano- or micro-crystals. Tungsten bronze particles are capable of shielding near infrared light to reduce the thermal effect of the solar light. The material in the powder form can be easily applied to any surface.

Various aerosol synthesis routes are known e.g. as described in Charitidis et al. (Manufacturing Rev., 2014) and Gurav et al. (*Aerosol Science and Technology,* 1993). An aerosol can be defined as a system of solid or liquid particles suspended in air or other gaseous environment. Particles can range from molecules up to 100 μm in size. Spraying is used either for drying wet materials or for applying coatings. When the precursor chemicals are sprayed onto a heated surface or into a hot atmosphere, a precursor pyrolysis occurs and particles are formatted.

Synthesis methods as described herein may include steps of atomizing a liquid solution comprising an alkali metal precursor and a tungsten precursor to produce droplets; mixing the droplets with one or more gaseous flows to produce a combined flow; flowing the combined flow through a heated reactor to provide crystalline tungsten bronze oxide particles having the formula $M_xWO_3$, wherein M is the alkali metal; and collecting the particles. In some embodiments, the methods described herein do not include flame-assisted spray pyrolysis and thus do not require an annealing step.

The alkali metal may be lithium, sodium, potassium, rubidium, cesium, or francium. In some embodiments, x is a number from zero to 1, e.g. 0.3-0.7. In some embodiments, the tungsten precursor is ammonium tungstate or tungsten chloride. In some embodiments, the ratio of alkali metal precursor to tungsten precursor is from 0.2:1 to 1.5:1, e.g. from 0.4:1 to 1:1. The alkali metal and tungsten precursors may be dissolved in water or an alcohol such as methanol. In some embodiments, the aqueous solution does not contain an organic solvent. In some embodiments, the alkali metal precursor may be present at a concentration of 1-40 mmol/L, e.g. about 10-30 mmol/L. In some embodiments, the tungsten precursor may be present at a concentration of 1-50 mmol/L, e.g. 3-10 mmol/L.

Atomization/neubulization refers to converting a bulk substance to minute parts/pieces in gas phase. Atomization may be accomplished, for example, using an ultrasonic nebulizer which atomizes the solution into aerosol droplets by using ultrasonic vibrations passed through the solution to generate an aerosol. Other atomizers/nebulizers such as a Collison or jet nebulizer which uses compressed air or a mesh nebulizer which uses high frequencies to vibrate a mesh may also be utilized to generate an aerosol.

With reference to FIG. 1, two inlet flows may enter the reactor. In this exemplary embodiment, Flow 1 passes through a water container which maintains the water at a specific temperature, e.g. 20-80° C., e.g. about 30-70° C. Flow 1 carries the moisture from the water container and mixes with Flow 2, which comes from the atomizer The precursor solution is fed in and sprayed by Flow 2 into the Collison atomizer to create the aerosol droplets. The mixture of Flow 1 and Flow 2 then enters the tube furnace. The aerosol droplets carried within the flow are converted into nanocrystalline particles in the heating process. Then, the particles are collected by the filter. A vent, e.g. one-way valve, is incorporated for safety. A portion of the aerosol particles may be utilized for measurement and characterization. Flow 1 and/or Flow 2 may contain one or more of nitrogen and hydrogen. In some embodiments, a flow rate of Flow 1 and/or Flow 2 may be 0.1-20 SLPM, e.g. 0.1-15 SLPM, 0.5-3 SLPM, or 0.5-1 SLPM.

Figure 2:
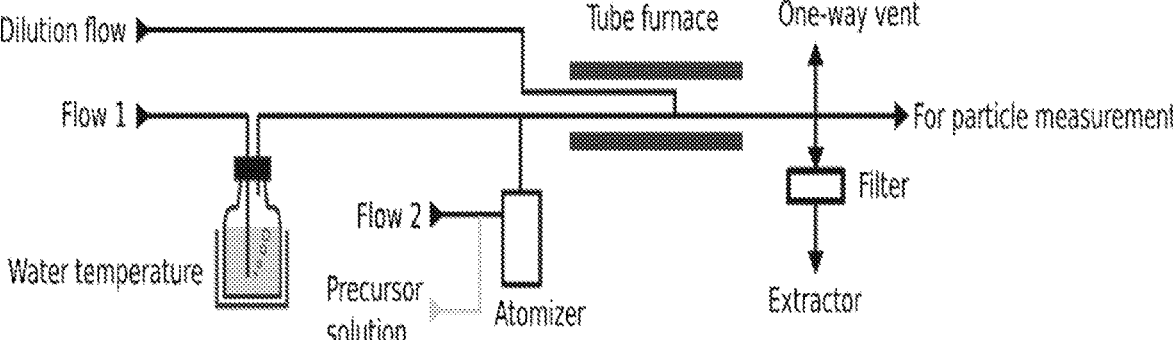
FIG. 2. Diagram of an aerosol-assisted reactor with a Collison atomizer and dilution flow according to some embodiments of the disclosure.

With reference to FIG. 2, a dilution flow may be introduced into the reactor along with Flows 1 and 2. The dilution flow may be introduced, for example, at a position near the tail end of the heating zone to quench the produced particles. In this way, the particle size can be tuned by the dilution ratio. The dilution flow may have a flow rate that is about 1-15 times (i.e. a ratio of 1:1 to 15:1), e.g. about 2-10 times, the combined flow rate of Flows 1 and 2.

Figure 3:
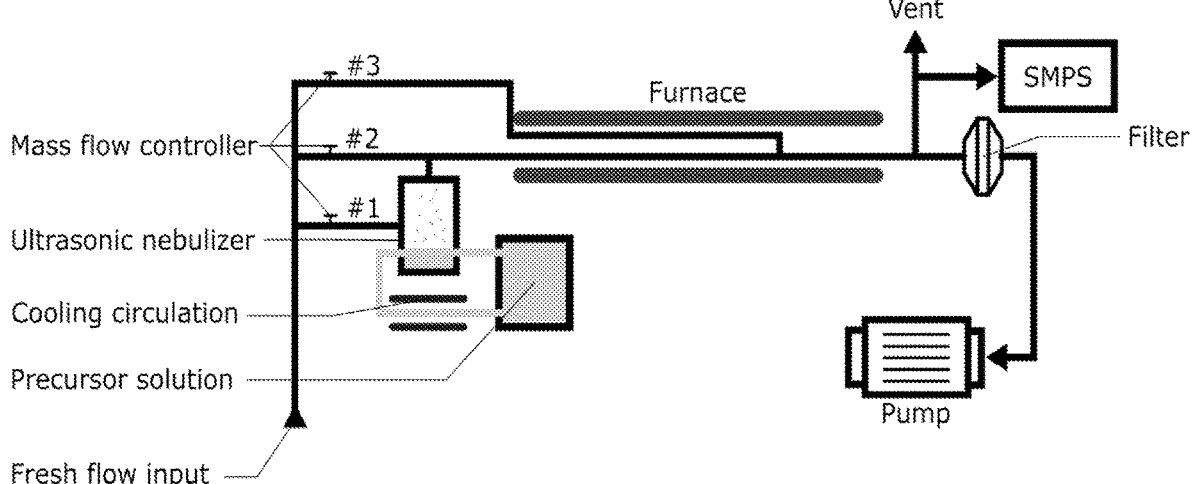
FIG. 3. Diagram of an aerosol-assisted reactor with an ultrasonic nebulizer and dilution flow according to some embodiments of the disclosure.

With reference to FIG. 3, the precursor solution may be driven by a device with cooling effect to circulate between ultrasonic nebulizer and solution container. The solution in container is kept stirring to maintain homogeneity. The ultrasonic nebulizer atomizes the solution into aerosol droplets. Then, the aerosol is carried by the gas flow controlled by #1 mass flow controller. The aerosol flow is mixed with another flow which is controlled by the #2 mass flow controller. The flow rate of the #1 and #2 flow determines the aerosol velocity passing through the furnace, which provides for the residence time in the high temperature. The combined flow enters into a tube furnace and then, mixes with the third flow (dilution flow) which is controlled by the #3 mass controller and does not contain any precursor. The dilution flow may be heated or unheated. The #3 flow also pass through the furnace and the mixing occurs at the end of the heating zone of the furnace to impose a dilution effect.

The flows described herein, including the dilution flow, may come from a fresh flow input, which is a gas source containing one or both of hydrogen and nitrogen. In some embodiments, the gas source contains 1-10% hydrogen, e.g. about 4% hydrogen and 90-99% nitrogen, e.g. about 96% nitrogen.

Figure 15:
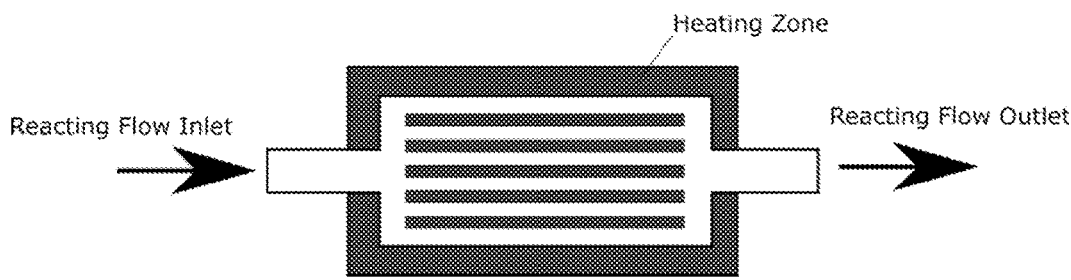
FIG. 15. Diagram of an aerosol-assisted reactor having a plurality of tubes according to some embodiments of the disclosure.
Figure 16:
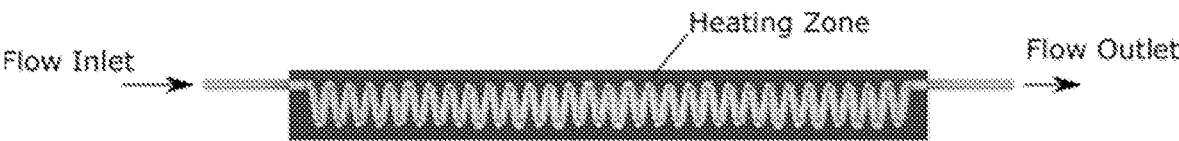
FIG. 16. Diagram of an aerosol-assisted reactor having a spiral tube according to some embodiments of the disclosure.
Figure 17:
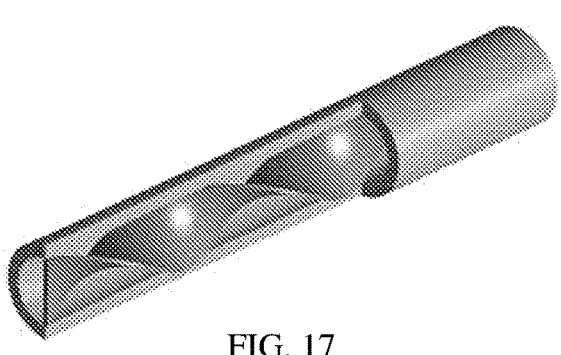
FIG. 17. Alternate view of an aerosol-assisted reactor having a spiral tube according to some embodiments of the disclosure.

The tube furnace reactor utilized in the methods described herein may have a diameter of about 0.5-2 inches, e.g. about 1 inch. In some embodiments, the heating zone length is about 1-3 feet, e.g. about 2 feet. In some embodiments, the reactor is heated to a temperature of 400-1000° C., e.g. about 500-900° C. The reactor can be made of any material that can sustain a high temperature (e.g. up to 1000° C.) and is chemically inert such as stainless steel. The reactor may comprise a single tube (FIG. 1) or a bundle of multiple tubes (FIG. 15). In some embodiments, the reactor includes one or more tubes having a spiral flow channel (FIGS. 16 and 17).

After the aerosol flow exits the furnace and cools down, the products are collected. Before collection, one outlet may introduce the sample aerosol to be measured by TSI SMPS to get the size distribution of particles. In some embodiments, the particles are collected using baghouse filter sampling, a cyclone, a cascade impactor, a thermo-precipitator, or electrostatic sampling. For the particle collection, a vacuum pump or injector provides the driving force for moving the particle stream through the collection devices. In some embodiments, the collected particles are in the cubic phase or tetragonal phase.

Figure 4:
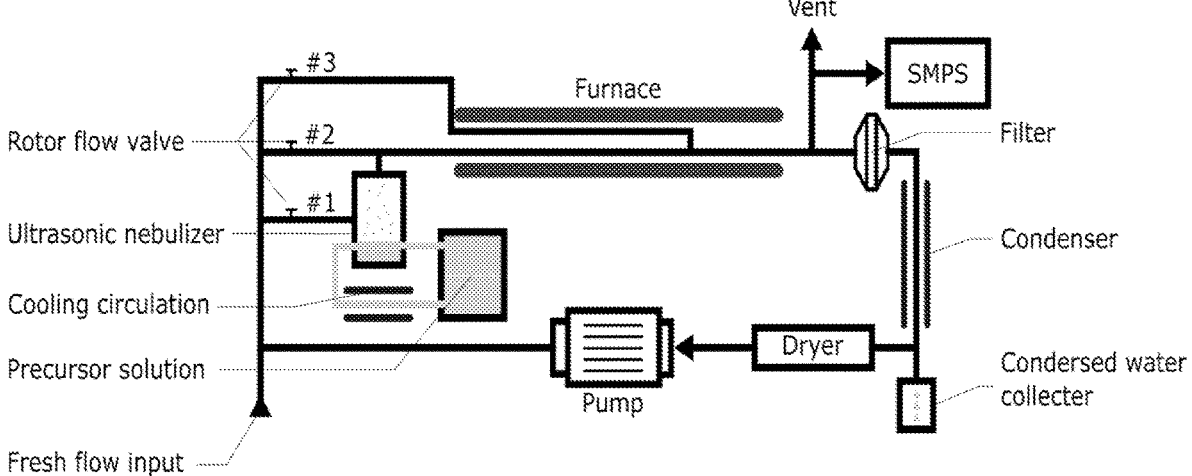
FIG. 4. Diagram of a recycle synthesis setup according to some embodiments of the disclosure.

With reference to FIG. 4, a recirculation process may be provided to reuse the carry gas and to decrease the usage of nitrogen and hydrogen at the same total volume. The condenser and dryer are provided to remove the moisture in the flow. Using this setup, the producing rate can be increased by at least 10 times, e.g. the total flow rate may be increased from ~25 SLPM to ~200 SLPM.

The crystalline tungsten bronze oxide particles synthesized by the methods described herein may be utilized in various NIR shielding applications. Tungsten bronze is capable of absorbing NIR (780 ~3000 nm) while having good transmission for visible light. Because ~50% energy in solar radiation is in the infrared (IR) range, having transparent medium, e.g., window glasses, with the NIR (near Infrared) shielding function will save energy and operational costs of air conditioning of a building/vehicle, e.g. by coating the particles onto automobile windshields or building windows. The particles in the powder form can be easily applied to surfaces of any shape, e.g. flat or curved surfaces. In some embodiments, the particles are mixed with resins, such as a PVB resin used in the inner layer of automobile windshields. For window applications, crystalline tungsten bronze particles can be embedded in hot glasses prior to the cooling or mixed with resin and coated on glass surfaces for the production of window glasses with permanent NIR shielding (offering a more cost-effective option as compared to smart windows). Due to hydrolysis reactions, tungsten bronze particles should not be exposed to a high humidity environment. However, this issue can be resolved by coating the tungsten bronze particles with a thin layer of refractory material, such as, TiO2.

Unless stated otherwise, all the ratios of reactants or products described herein are mole ratios.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

Example 1

Figure 5:
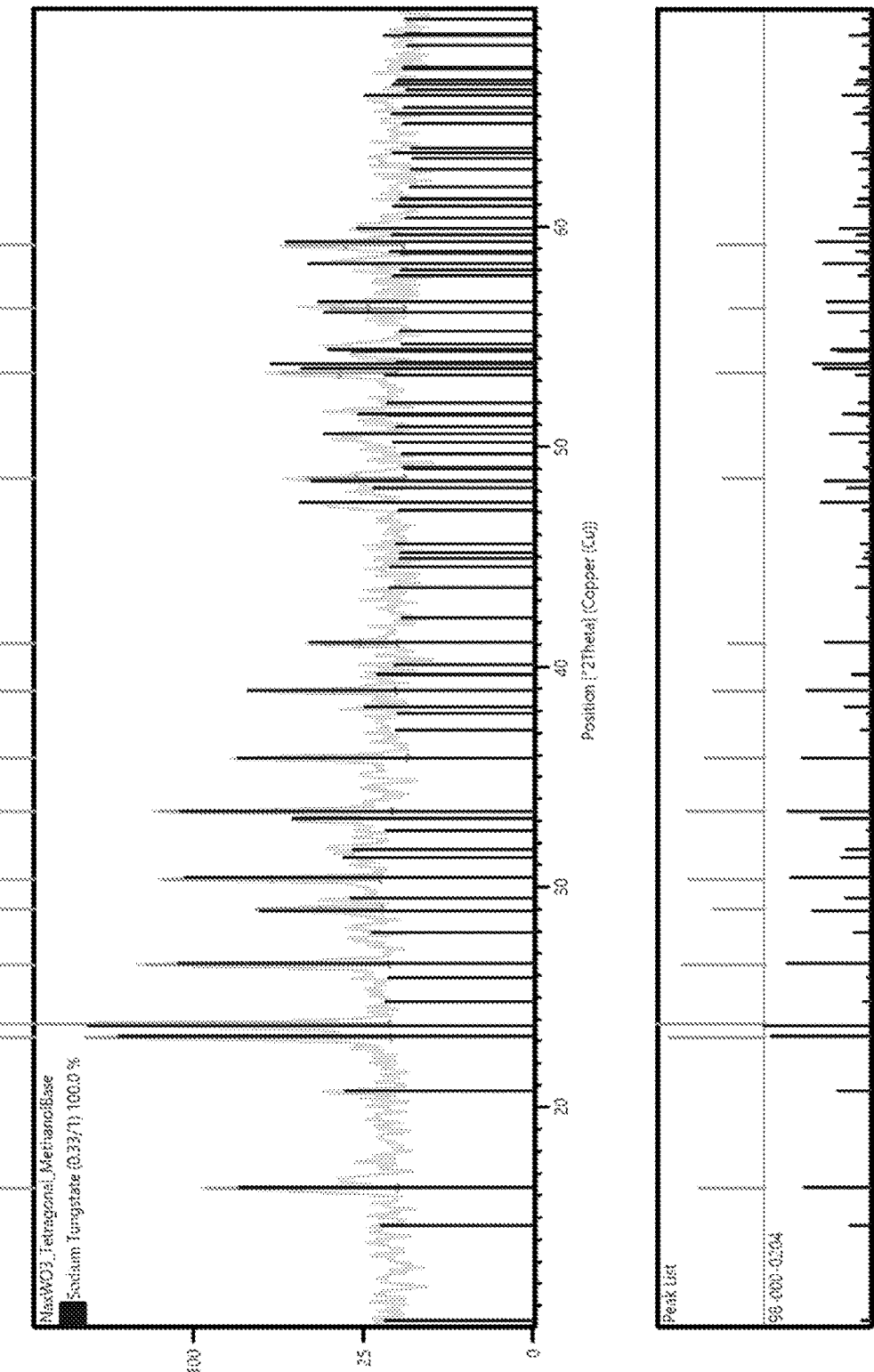
FIG. 5. XRD pattern of Produced $Na_{0.3}WO_3$ Particles.
Figure 6:
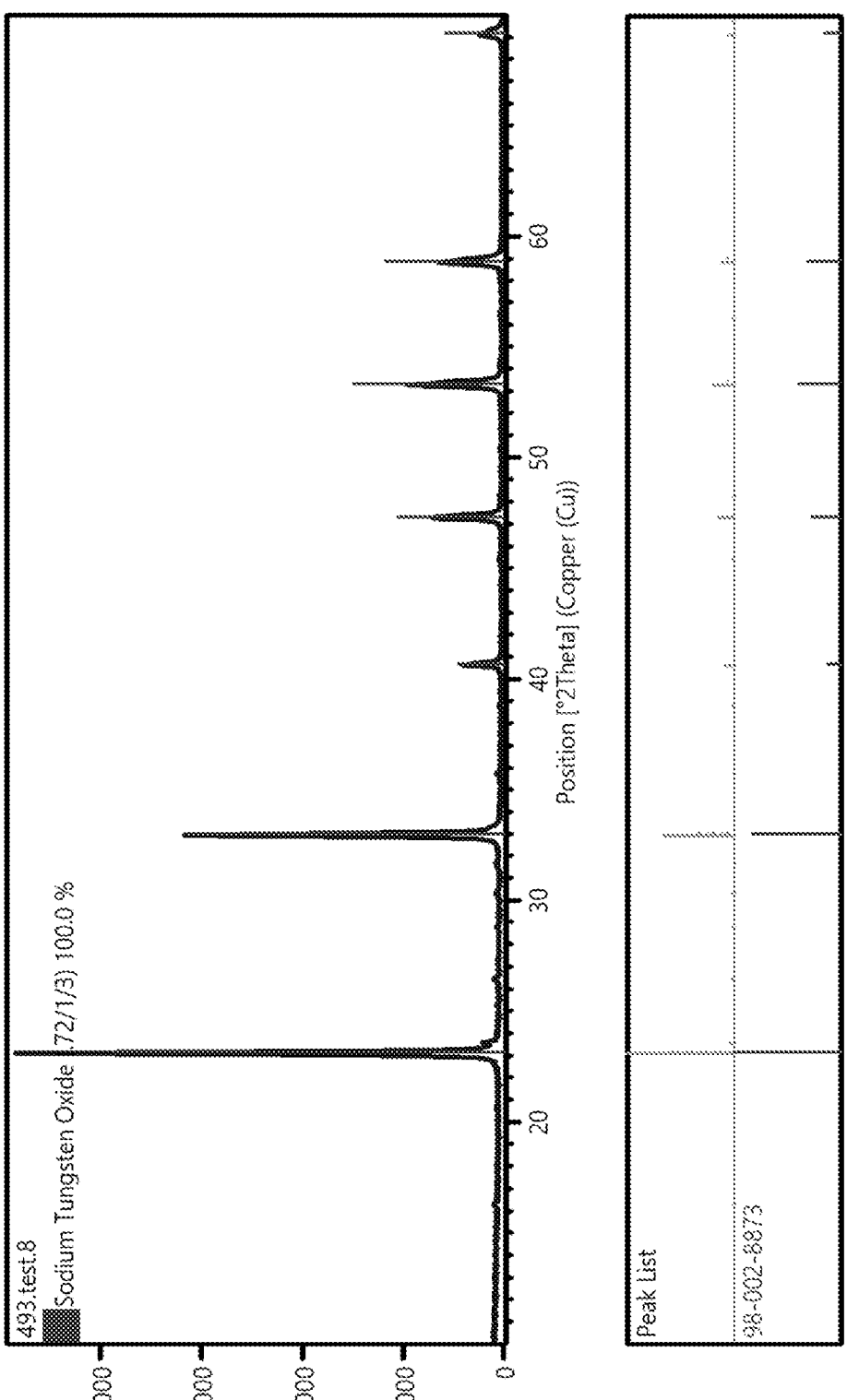
FIG. 6. XRD pattern of Produced $Na_{0.7}WO_3$ Particles.
Figure 7:
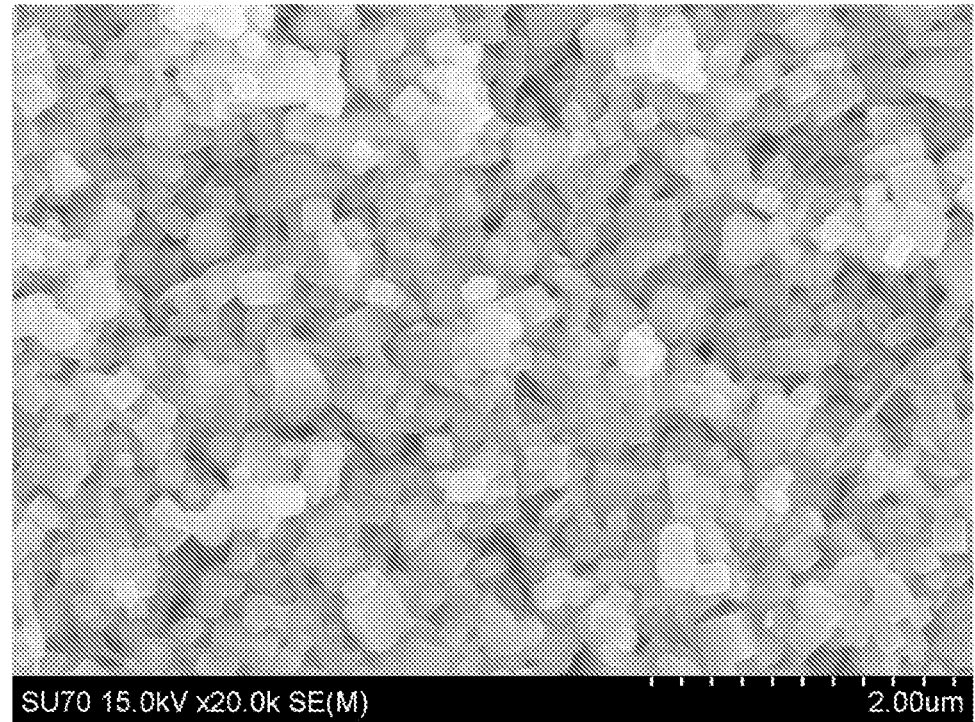
FIG. 7. SEM image of Produced $Na_{0.7}WO_3$ Particles.

Dissolve sodium chloride (NaCl, 12 and 35 mmol/L) and tungsten chloride ($WCl_6$, 50 mmol/L) into methanol (MeOH, 95 vol %) & ethylene glycol (EG, 5 vol %) to form the precursor solution. The precursor feed-in rate is 0.3 mL/min An aerosol-assisted reactor as shown in FIG. 1 was used as the synthesis device. Flow 1 is 0.5 SLPM. Flow 2 is 1.5 SLPM. The flow gas composition is nitrogen ($N_2$, 100 vol %). The as-produced $Na_{0.3}WO_3$ and $Na_{0.7}WO_3$ particle XRD (X-ray powder Diffraction) pattern is shown in FIGS. 5 and FIG. 6. FIG. 7 shows the SEM (Scanning Electron Microscope) image of as-produced $Na_{0.7}WO_3$ particles.

Example 2

Figure 8:
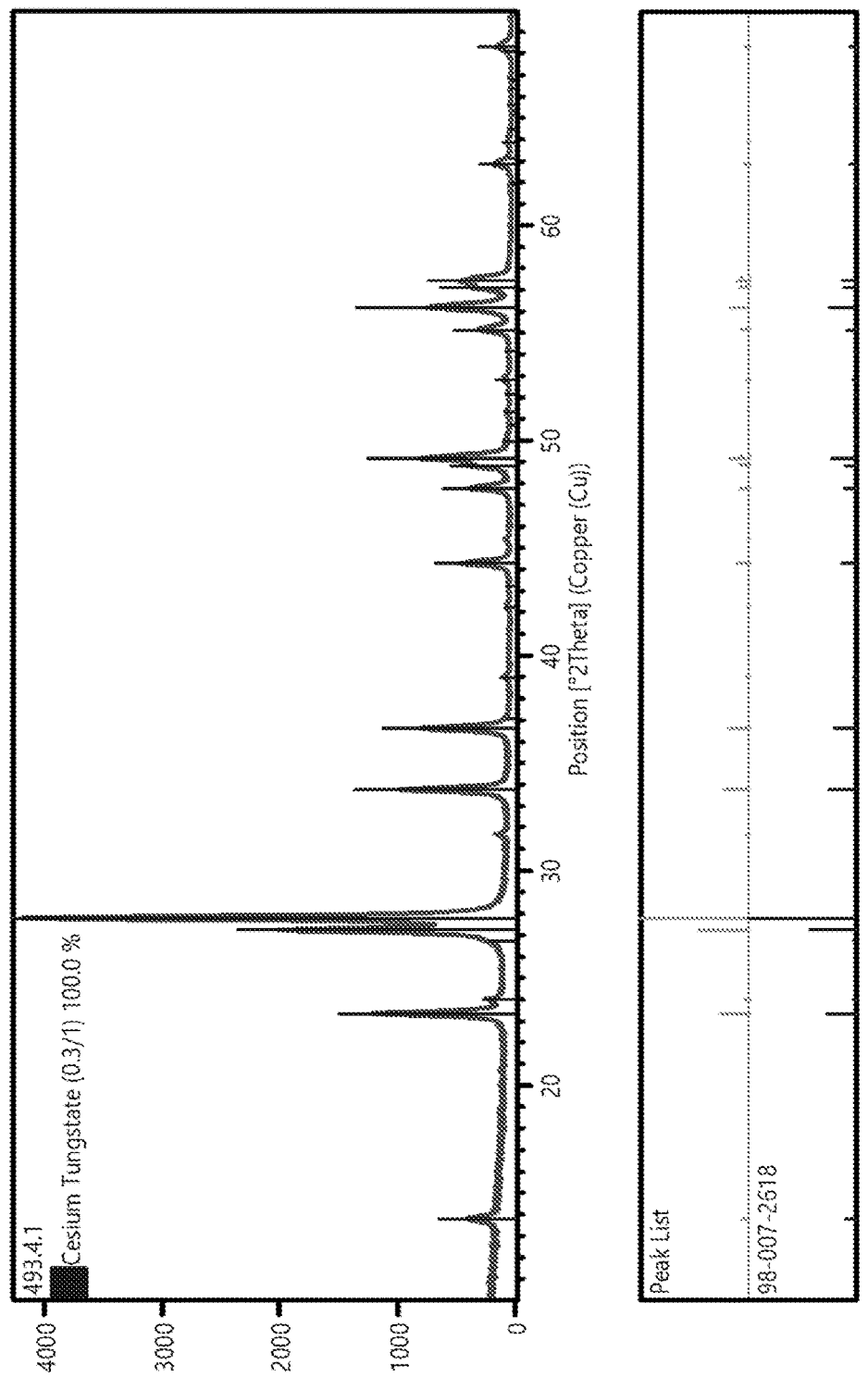
FIG. 8. XRD pattern of Produced $Cs_{0.3}WO_3$ Particles.
Figure 9:
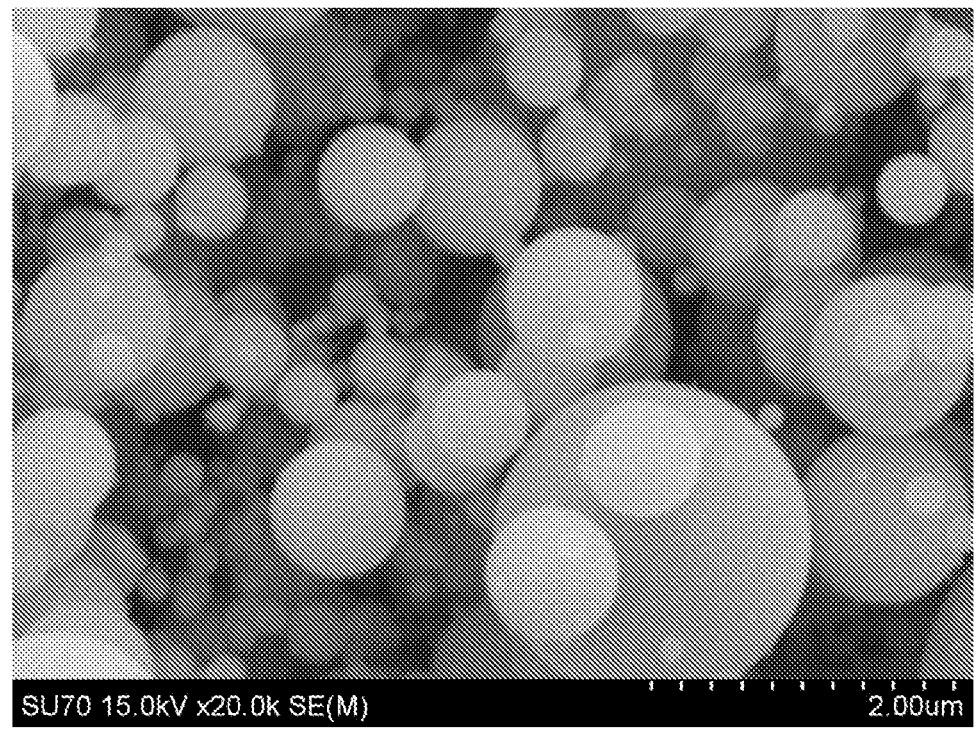
FIG. 9. SEM image of Produced $Cs_{0.3}WO_3$ Particles.

Dissolve cesium chloride (CsCl, 0.15 mol/L) and tungsten chloride ($WCl_6$, 0.5 mol/L) into methanol and ethylene glycol (EG, 100 vol %) to form the precursor solution. The precursor feed-in rate is 0.050 mL/min. An aerosol-assisted reactor as shown in FIG. 1 was used as the synthesis device. Flow 1 is 1 SLPM. Flow 2 is 3 SLPM. The flow gas composition is nitrogen & hydrogen ($N_2$, 75 vol %; $H_2$ 25 vol %). The as-produced $Cs_{0.3}WO_3$ particle XRD (X-ray powder Diffraction) pattern is shown in FIG. 8. FIG. 9 shows the SEM (Scanning Electron Microscope) image of as-produced $Na_{0.7}WO_3$ particles.

Example 3

Figure 10:
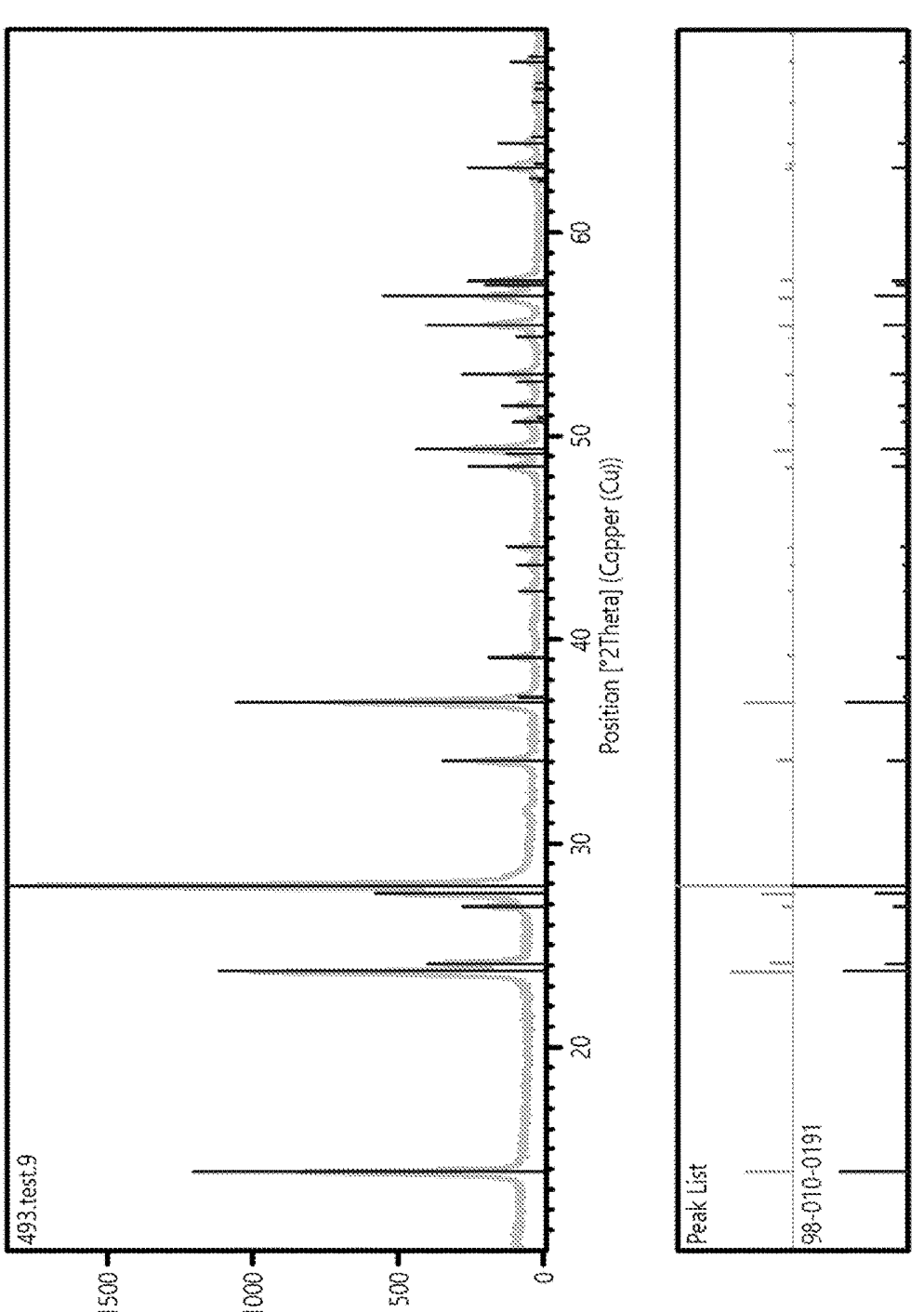
FIG. 10. XRD pattern of Produced $K_{0.3}WO_3$ Particles.

Dissolve cesium chloride (KCl, 0.15 mol/L) and tungsten chloride ($WCl_6$, 0.5 mol/L) into methanol and ethylene glycol (EG, 100 vol %) to form the precursor solution. The precursor feed-in rate is 0.050 mL/min. An aerosol-assisted reactor as shown in FIG. 2 was used as the synthesis device. Flow 1 is 1 SLPM. Flow 2 is 1 SLPM. Dilution flow is 3 SLPM. The flow gas composition is nitrogen & hydrogen ($N_2$, 75 vol %; $H_2$ 25 vol %). The as-produced $K_{0.3}WO_3$ particle XRD (X-ray powder Diffraction) pattern is shown in FIG. 10.

Example 4

Figure 11:
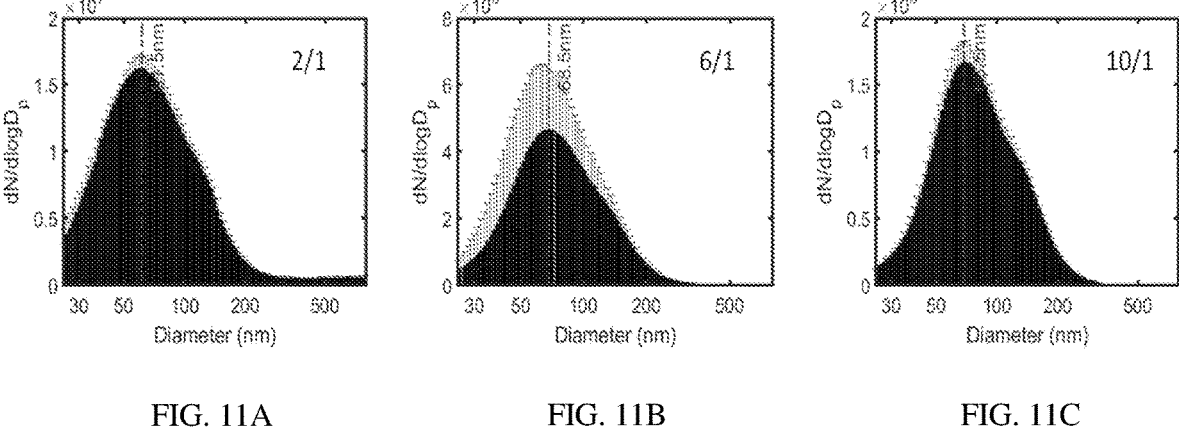
FIGS. 11A-C. Produced particle number size distribution on dilution ratio (A) 2/1, (B) 6/1 and (C) 10/1.
Figure 12:
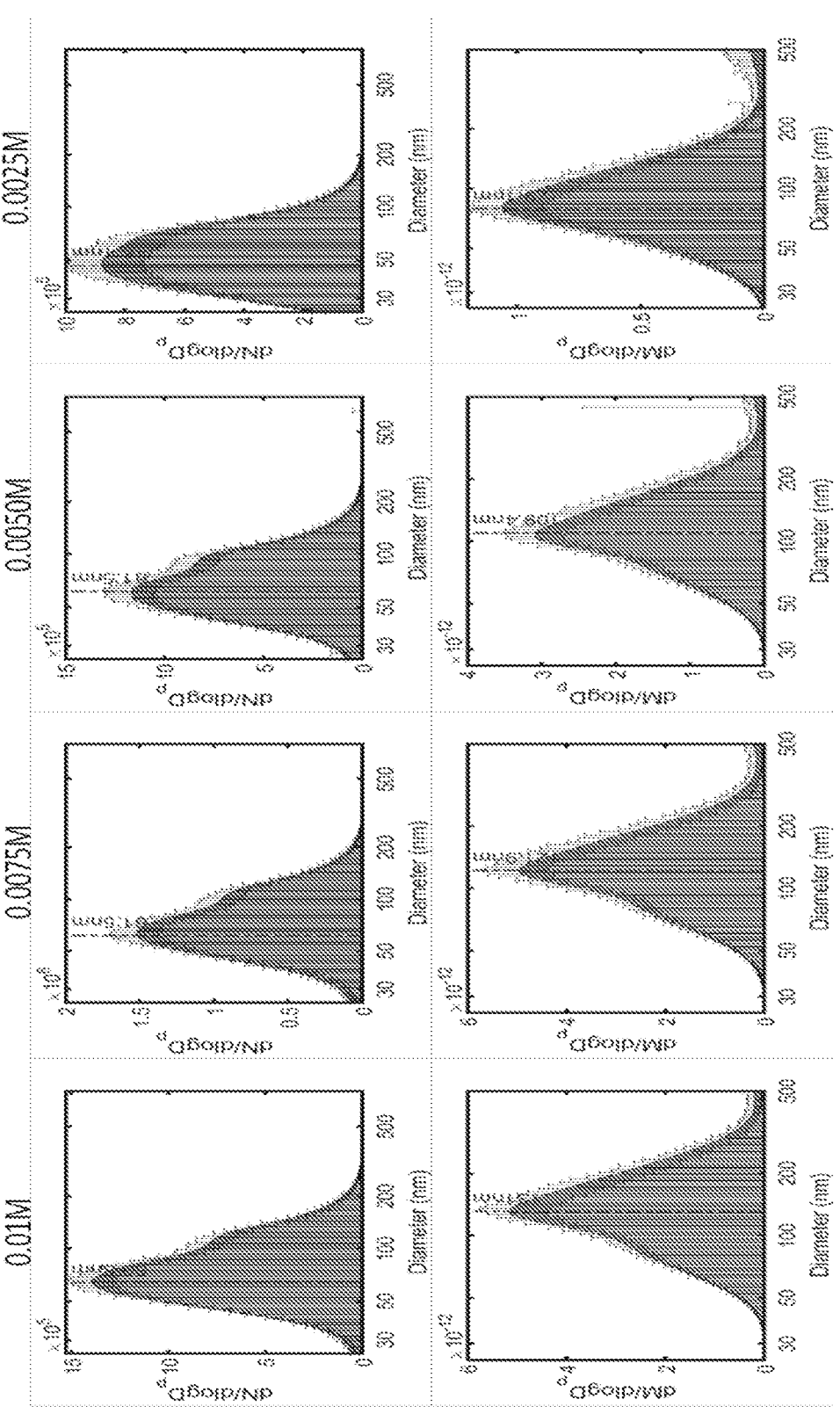
FIG. 12. Produced particle number ($1^{st}$ row) and mass ($2^{nd}$ row) size distribution on precursor solution concentration at 0.01 M, 0.0075 M 0.0050 M and 0.0025 M (on the mole concentration of W element).

Dissolve sodium chloride (NaCl, 28 mmol/L) and Ammonium tungsten oxide hydrate (($NH_4)_{10}W_{12}O_{41} \cdot xH_2O$, 3.33 mmol/L) into water ($H_2O$, 100 vol %) to form the precursor solution. An aerosol-assisted reactor as shown in FIG. 3 was used as the synthesis device. Flow #1 is 0.5 SLPM. Flow #2 is 0.5 SLPM. Flow #3 is 3~5 SLPM. The flow gas composition is nitrogen & hydrogen ($N_2$, 75 vol % and $H_2$ 25 vol %). By adjusting the dilution flow ratio (Flow #3 to the sum of Flow #1 and Flow #2) and precursor solution concentration, the size of the particles was adjusted. The size distribution of produced particles are shown in FIGS. 11 and FIG. 12.

Example 5

According to the precursor solution composition and final products, Table 1 provides example recipes for different tungsten bronze products. This table encompasses all aerosol-assisted reactor types.

TABLE 1

| Configuration for different tungsten bronze products. | | | | |
|---|---|---|---|---|
| Precursor | Precursor solution salt | | Flow gas | Major |
| solution solvent | Alkali metal halide | Tungsten salt | composition | product |
| MeOH 95 vol %, | 35 mmol/L NaCl | 50 mmol/L WCl$_6$ | N$_2$ 100 vol % | Na$_{0.7}$WO$_3$ |
| EG 5 vol % | 15 mmol/L NaCl | | | Na$_{0.3}$WO$_3$ |
| | 15 mmol/L KCl | | | K$_{0.3}$WO$_3$ |
| | 15 mmol/L CsCl | | | Cs$_{0.3}$WO$_3$ |
| EG 100 vol % | 0.35 mol/L NaCl | 0.5 mol/L WCl$_6$ | N$_2$ 75 vol %, | Na$_{0.7}$WO$_3$ |
| | 0.15 mol/L NaCl | | H$_2$ 25 vol % | Na$_{0.3}$WO$_3$ |
| | 0.15 mol/L KCl | | | K$_{0.3}$WO$_3$ |
| | 0.15 mol/L CsCl | | | Cs$_{0.3}$WO$_3$ |
| Water 100 vol % | 28 mmol/L NaCl, | 3.33 mmol/L | | Na$_{0.7}$WO$_3$ |
| | 12 mmol/L NaCl | (NH$_4$)$_{10}$W$_{12}$O$_{41}$·XH$_2$O | | Na$_{0.3}$WO$_3$ |
| | 12 mmol/L KCl | | | K$_{0.3}$WO$_3$ |
| | 12 mmol/L CsCl | | | Cs$_{0.3}$WO$_3$ |

Example 6

Figures 13A, 13B, 13C:
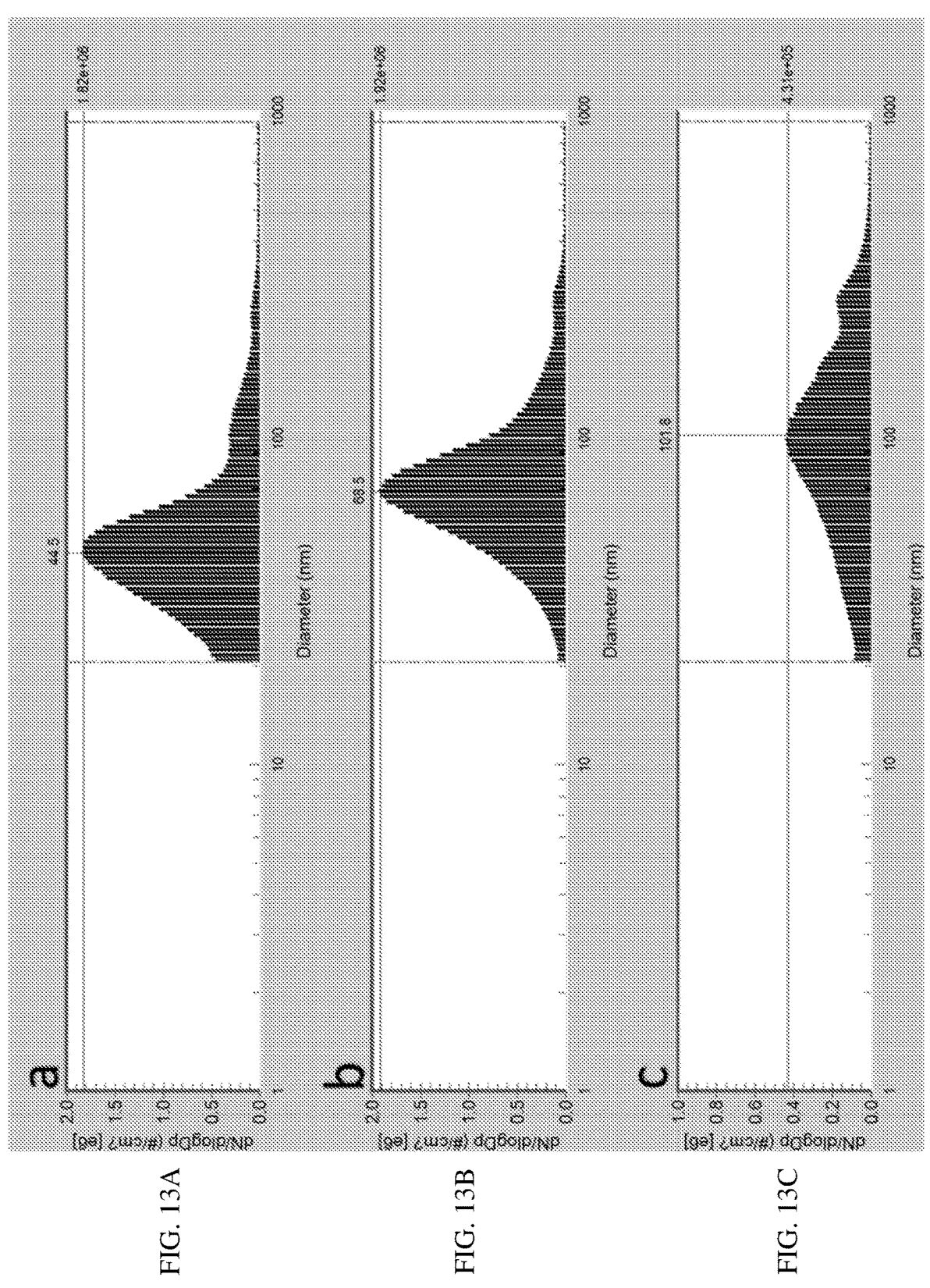
FIGS. 13A-C. Particle size distribution when Flow #1 of reactor shown in FIG. 3 has a rate of (A) 0.2 SLPM, (B) 1 SLPM, or (C) 4 SLPM.

The size distribution of particles produced by the reactor shown in FIG. 3 can be tuned in the range below 1000 nm. For example, if the setup parameters are set as in Table 2, the size distribution of particle products are shown in FIG. 13. A key factor relating particle size is the dilution ratio for the aerosol flow before cool down from high temperature, which is controlled by #1 #2 and #3 flow rate.

TABLE 2

| Setup parameters | |
|---|---|
| Parameter name (in FIG. 1) | Value |
| Mass flow controller #1 | 0.2 SLPM (FIG. 13A), |
| | 1 SLPM (FIG. 13B), |
| | 4 SLPM (FIG. 13C) |
| Mass flow controller #2 | 1 SLPM |
| Mass flow controller #3 | 5 SLPM |

Example 7

Figure 14:
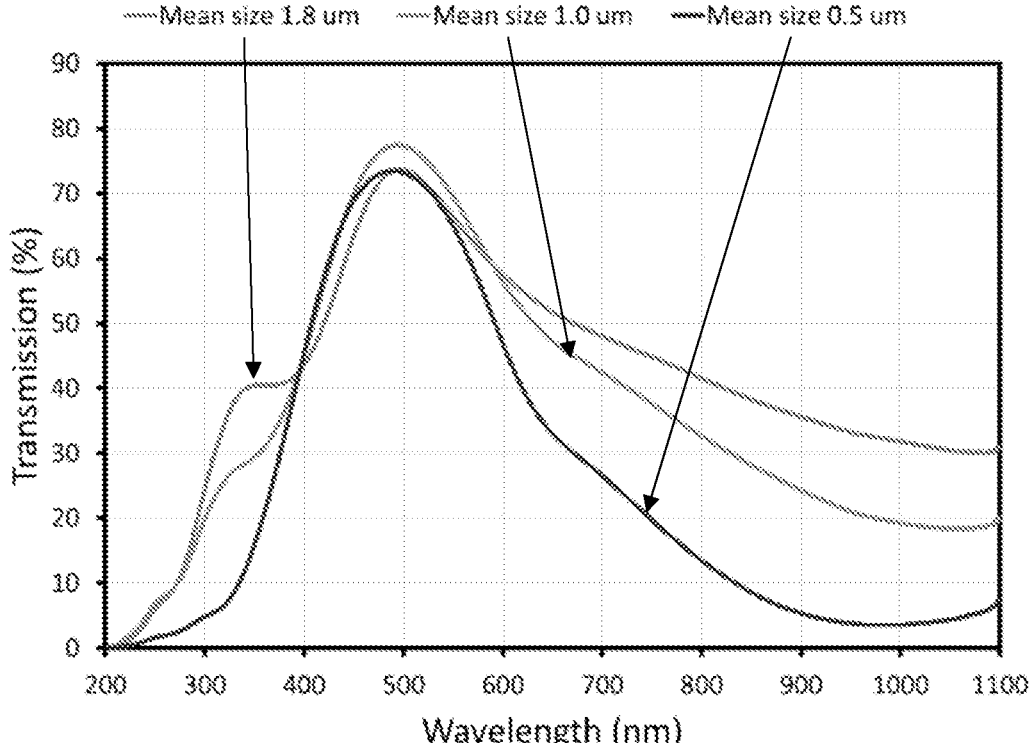
FIG. 14. UV-VIS of different aerodynamic diameter sample of sodium tungsten bronze particles. Note: aerodynamic diameter is equal to $d_a=d_p(\rho_p/\rho_0)^{1/2}[\rho_0=1000 \text{ kg·m}^{-3}, \rho_p$ is particle density, for bulk $Na_xWO_3$ crystal, $\rho_p \leq 7.4 \text{ g·cm}^{-3}]$.

FIG. 14 shows the UV-Vis of Na$_x$WO$_3$ (x=~0.7) dispersed in IPA solution. It shows different particle size products have different performance on UV and NIR light shielding. When the mean aerodynamic diameter of particles is below 0.5 μm, the shielding effect is enhanced.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method for producing crystalline tungsten bronze oxide particles, comprising
    atomizing a liquid solution comprising an alkali metal precursor and a tungsten precursor to produce droplets, wherein a molar ratio of alkali metal precursor to tungsten precursor is from 0.4:1 to 1:1;
mixing the droplets with one or more gaseous flows to produce a combined flow;
flowing the combined flow through a heated reactor to provide crystalline tungsten bronze oxide particles having the formula M$_x$WO$_3$, wherein M is the alkali metal and x is a number from zero to 1; and
collecting the particles.

2. The method of claim 1, wherein the particles are collected using baghouse filter sampling, a cyclone, an impactor, a thermo-precipitator, or electrostatic sampling.

3. The method of claim 1, wherein the tungsten precursor is ammonium tungstate or tungsten chloride.

4. The method of claim 1, wherein the alkali metal is selected from sodium, potassium, and cesium.

5. The method of claim 1, wherein the one or more gaseous flows comprise nitrogen and hydrogen.

6. The method of claim 1, wherein a flow rate through the reactor is 0.1-15 SLPM.

7. The method of claim 1, wherein the reactor comprises a plurality of tube reactors.

8. The method of claim 1, wherein the reactor comprises a spiral flow channel.

9. The method of claim 1, wherein the reactor is heated to a temperature of 600-1000° C.

10. A method for producing crystalline tungsten bronze oxide particles, comprising
    atomizing a liquid solution comprising an alkali metal precursor and a tungsten precursor to produce droplets;
    mixing the droplets with one or more gaseous flows to produce a combined flow;
    flowing the combined flow through a heated reactor to provide crystalline tungsten bronze oxide particles having the formula M$_x$WO$_3$, wherein M is the alkali metal and x is a number from zero to 1; and
    collecting the particles, wherein the particles are in the cubic phase or tetragonal phase.

11. The method of claim 1, further comprising recirculating a gaseous flow after the particles are collected.

12. The method of claim 1, wherein the liquid solution is an aqueous solution and does not contain an organic solvent.

13. The method of claim 1, wherein the method does not include an annealing step.

14. A method for producing crystalline tungsten bronze oxide particles, comprising atomizing a liquid solution comprising an alkali metal precursor and a tungsten precursor to produce droplets;

mixing the droplets with one or more gaseous flows to produce a combined flow;

flowing the combined flow through a heated reactor to provide crystalline tungsten bronze oxide particles having the formula $M_xWO_3$, wherein M is the alkali metal and x is a number from zero to 1;

introducing a dilution flow to the combined flow flowing through the reactor; and collecting the particles.

15. The method of claim 14, wherein a ratio of a flow rate of the dilution flow to a flow rate of the combined flow is from 2:1 to 10:1.

16. The method of claim 14, wherein the dilution flow is heated.

17. The method of claim 14, wherein the dilution flow is unheated.

* * * * *